(12) United States Patent
Meyer

(10) Patent No.: US 7,660,377 B2
(45) Date of Patent: Feb. 9, 2010

(54) DEVICE FOR ESTIMATING A TIMING CORRECTION LOOP ERROR FOR A DIGITAL DEMODULATOR

(75) Inventor: Jacques Meyer, Corenc (FR)

(73) Assignee: STMicroelectronics S.A., Montrouge (FR)

( * ) Notice: Subject to any disclaimer, the term of this patent is extended or adjusted under 35 U.S.C. 154(b) by 596 days.

(21) Appl. No.: 11/270,388

(22) Filed: Nov. 9, 2005

(65) Prior Publication Data
US 2006/0098763 A1    May 11, 2006

(30) Foreign Application Priority Data
Nov. 9, 2004   (FR)   .................................... 04 52576

(51) Int. Cl.
*H04L 7/00* (2006.01)
(52) U.S. Cl. .................. 375/355; 375/373; 375/320; 375/329; 370/503; 370/516
(58) Field of Classification Search ................. 375/355, 375/376
See application file for complete search history.

(56) References Cited

U.S. PATENT DOCUMENTS

| 4,416,015 A | 11/1983 | Gitlin | |
|---|---|---|---|
| 4,646,173 A * | 2/1987 | Kammeyer et al. | 360/51 |
| 6,377,634 B1 * | 4/2002 | Yamamoto | 375/324 |
| 6,621,857 B1 | 9/2003 | Belotserkovsky et al. | |
| 2001/0017902 A1 | 8/2001 | Yamagata et al. | |
| 2001/0031021 A1 | 10/2001 | Fujimura et al. | |
| 2001/0048723 A1 | 12/2001 | Oh | |

OTHER PUBLICATIONS

French Search Report from French Patent Application 04/52576, filed Nov. 9, 2004.

* cited by examiner

*Primary Examiner*—Shuwang Liu
*Assistant Examiner*—Lihong Yu
(74) *Attorney, Agent, or Firm*—Lisa K. Jorgenson; William R. McClellan; Wolf, Greenfield & Sacks, P.C.

(57) ABSTRACT

A device for providing a digital error signal, for a timing correction loop of a digital demodulator for digital transmission by phase modulation or amplitude and phase modulation, the device successively receiving pairs of digital signals representative of the components of complex signals, and having circuitry for providing a difference signal representative of the difference between the modulus of the complex signal corresponding to the last received pair of digital signals and the modulus of the complex signal corresponding to the previously-received pair of digital signals; circuitry for providing a weighting factor which depends on the angle between the complex signal corresponding to the last received pair of digital signals and the complex signal corresponding to the previously-received pair of digital signals; and circuitry for providing the error signal proportional to the product of the difference signal and of the weighting factor.

10 Claims, 2 Drawing Sheets

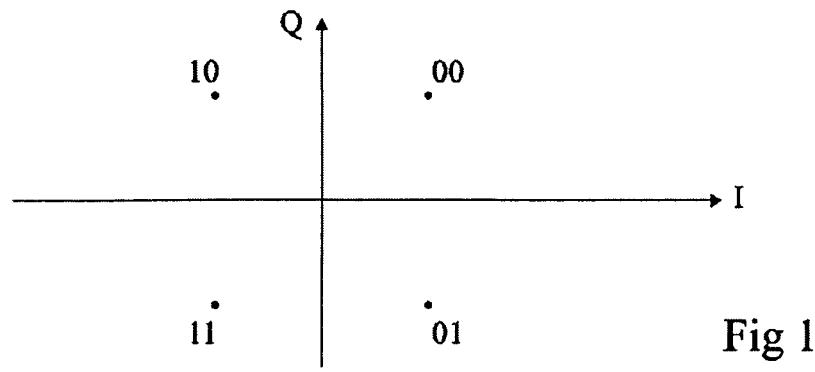
Fig 1
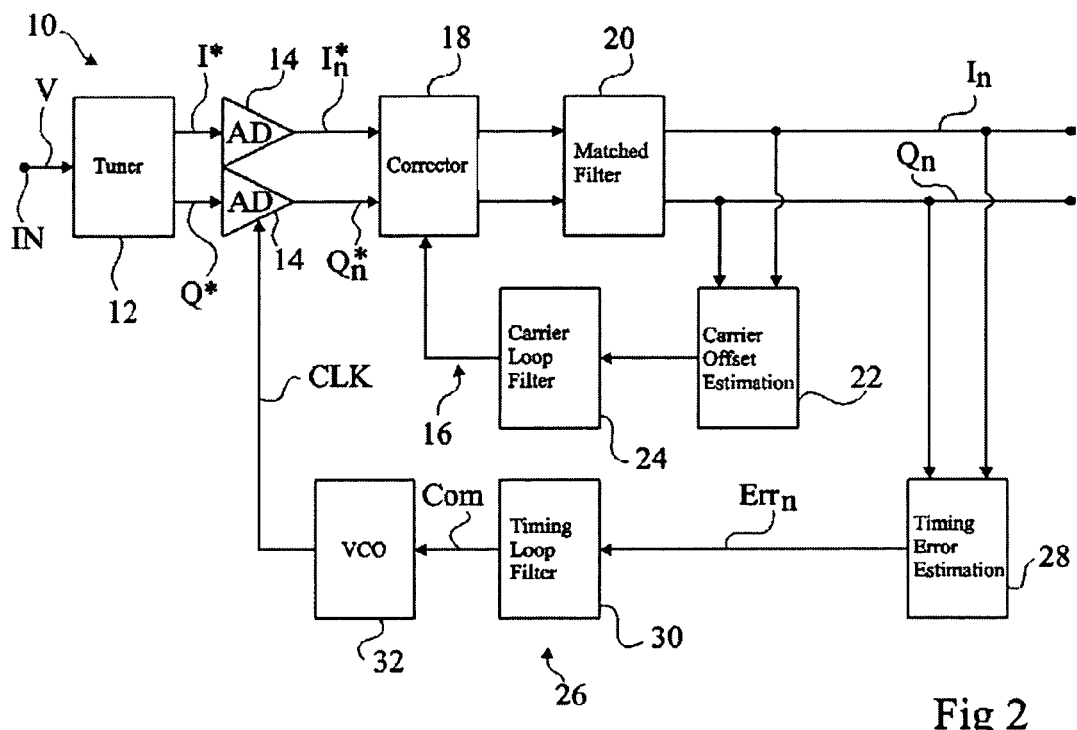
Fig 2
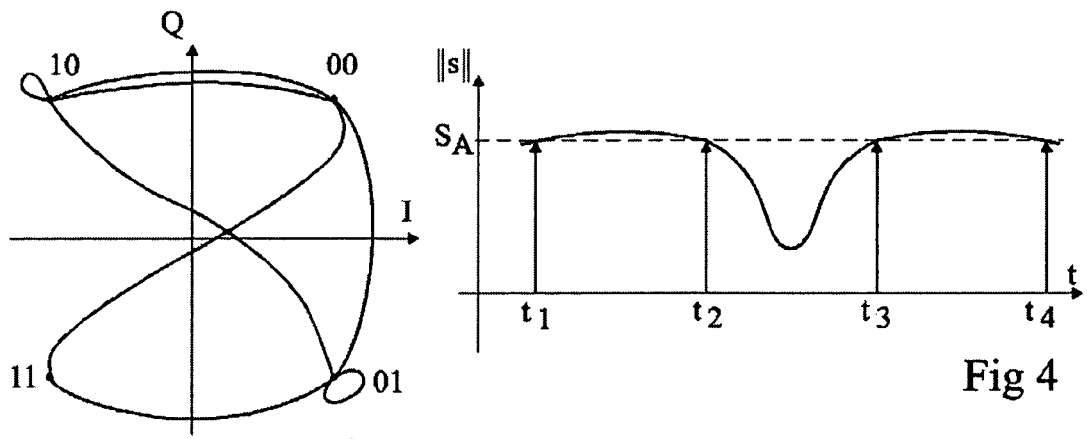
Fig 3
Fig 4

DEVICE FOR ESTIMATING A TIMING CORRECTION LOOP ERROR FOR A DIGITAL DEMODULATOR

BACKGROUND OF THE INVENTION

1. Field of the Invention

The present invention relates to a demodulator for digital transmission, in which symbols are transmitted by phase modulation, or by amplitude and phase modulation.

2. Discussion of the Related Art

In an ideal carrier-modulation wide-band digital transmission, each transmitted symbol is formed by one or several periods of a sinusoid, where one parameter among the amplitude, frequency and/or phase has been modified, the modified parameter being only able to take a limited number of discrete values.

In the case of an ideal wide-band phase modulation, the transmitted modulated signal v complies with the following relation:

$$v(t)=A\cos(2\pi ft+\phi(t)) \quad (1)$$

where f is the carrier frequency, A is the signal amplitude, and $\phi$ is the signal phase. The spectrum of the modulated signal corresponds to the baseband signal spectrum shifted around the carrier frequency with a suppression of the latter. Equation (1) can be written as:

$$v(t)=A[\cos 2\pi ft *\cos\phi(t)-\sin\pi ft*\sin\phi(t)] \quad (2)$$

Equation (2) corresponds to the sum of two amplitude-modulated carriers in quadrature. Generally, equation (1) can be written as:

$$v(t)=Re(ae^{j(2\pi ft+\phi)})=Re(ae^{j\phi}e^{j2\pi ft}) \quad (3)$$

Complex amplitude $ae^{j\phi}$ is represented, in the complex plane, by a point having its coordinates I and Q given by the following relation:

$$I=a\times\cos\phi \text{ and } Q=a\times\sin\phi \quad (4)$$

For an ideal M-state phase-modulation digital transmission, phase $\phi$ can take discrete values from among M values, which corresponds to M points or states in the complex plane. The arrangement of points in the complex plane is called a constellation. The number of bits that can be coded for each transmitted symbol is equal to $\text{Log}_2(M)$.

FIG. 1 shows an example of a constellation for an ideal four-state phase modulation or QPSK (Quadrature Phase Shift Keying) modulation. Each transmitted symbol corresponds to one of the four phase states and carries a two-bit word information. As an example, in FIG. 1, the sequence of bits coded by each state has been shown next to said state.

The transmitted modulated signal can be written as:

$$v(t)=x\cos 2\pi ft+y\sin 2\pi ft \quad (5)$$

where x and y are equal to ±1. Such a modulation is frequently used in digital telephony.

FIG. 2 shows an example of a conventional demodulator 10 for phase-modulation digital transmission. Demodulator 10 receives a modulated signal v at an input terminal IN. Signal v is provided to a unit 12 (tuner) for transferring the signal in baseband. The operation of the baseband transfer unit requires determination of the frequency of the carrier used for the modulation of the transmitted symbols. Unit 12 provides two analog signals $I^*$, $Q^*$ which correspond, in the complex plane of the constellation, to components of a complex signal s. Signals $I^*$, $Q^*$ are converted into digital signals $I^*_n$, $Q^*_n$ by analog-to-digital converters 14 (AD) controlled by a sampling clock signal CLK. Given the inaccuracies and the fluctuations on determination of the carrier used by unit 12, an additional correction must generally be performed on digital signals $I^*_n$, $Q^*_n$ to correct a frequency shift of the carrier, which will be called hereafter a carrier shift. A carrier shift translates as a rotation of the constellation in the complex plane. A correction of the carrier shift is performed by a carrier shift correction loop 16 which comprises a correction unit 18 (corrector) which corrects signals $I^*_n$, $Q^*_n$ and drives an adapted filter 20 which provides filtered digital signals $I_n$, $Q_n$. A carrier offset estimation unit 22 receives digital signals $I_n$, $Q_n$ and determines an error signal representative of the carrier shift. The carrier shift error signal is transmitted to a filter 24 (carrier loop filter) which provides a control signal to correction unit 18.

Another correction should be performed due to the fact that, in practice, the implemented phase modulation is not an ideal phase modulation. Such a correction concerns the determination of the sampling times of signals $I^*_n$, $Q^*_n$ provided by unit 12. Indeed, to limit the passband of the modulated signal, the carrier modulation is not performed by an abrupt switching from one state to another of the constellation but by a continuous transition between the constellation states. It is thus desirable for signals $I^*$, $Q^*$ to be sampled at optimal times corresponding to the passing of signal s through states of the constellation and not at times corresponding to transitions between two states. Such a correction is performed by a timing correction loop 26. Timing correction loop 26 comprises a timing error estimation device 28 which receives signals $I_n$, $Q_n$ and provides an error signal $\text{Err}_n$ to a filter 30 (timing loop filter). Filter 30 provides a control signal Com to a voltage-controlled oscillator 32 (VCO) which provides sampling clock signal CLK to analog-to-digital converters 14 at a sampling frequency which depends on control signal Com.

There are several examples of timing error estimation devices. A first device example implements the Gardner algorithm (defined in the publication entitled "A BPSK/QPSK Timing Error Detector for Sampled Receivers", IEEE Transactions of Communications, Vol. Com-34, pages 423-429, May 1986). Such an error estimation device provides an error signal according to the following relation:

$$\text{Err}_n=I_n[I_{n+1/2}-I_{n-1/2}]+Q_n[Q_{n+1/2}-Q_{n-1/2}] \quad (6)$$

where n represents the index of the considered symbol. Such a determination of the error signal has the advantage of being independent from the phase of the carrier and thus accepts a significant carrier frequency shift. The provision of a usable error signal $\text{Err}_n$ thus does not require for the carrier shift correction loop 16 to have converged. However, a disadvantage of such a timing error estimation is that it requires determination, for a symbol of index n, of two additional inter-symbol values noted by indexes n±½.

Another example of a timing error estimation device uses the Mueller and Müller algorithm (defined in the publication entitled "Timing Recovery in Digital Synchronous Data Receivers", IEEE Transactions on Communications, Vol. Com-26, pages 516-531, May 1976). The Mueller and Müller algorithm requires for an assumption to be made on the value of the complex signal corresponding to components $I_n$, $Q_n$, for example, considering that the constellation point closest to the sampled symbol corresponds to that which should be received. Such an error estimation has the advantage of not requiring determination of additional inter-symbol values between two sampled symbols. However, it has two significant disadvantages: the first one is that the constellation must be known, the second one is that it is sensitive to a shift of the carrier and thus requires for the carrier shift correction loop to have converged.

SUMMARY OF THE INVENTION

The present invention aims at a timing error estimation device which requires no determination of additional inter-symbol values with respect to the sampled values and which is little sensitive to a carrier shift.

According to another object, the present invention aims at a timing error estimation device of simple design.

To achieve these and other objects, the present invention provides a device for providing a digital error signal, for a timing correction loop of a digital demodulator for digital transmission by phase modulation or amplitude and phase modulation, the device successively receiving pairs of digital signals representative of the components of complex signals, and comprising means for providing a difference signal representative of the difference between the modulus, raised to a determined power, of the complex signal corresponding to the last received pair of digital signals and the modulus, raised to the determined power, of the complex signal corresponding to the previously-received pair of digital signals; means for providing a weighting factor which depends on the angle between the complex signal corresponding to the last received pair of digital signals and the complex signal corresponding to the previously-received pair of digital signals; and means for providing the error signal proportional to the product of the difference signal and of the weighting factor.

According to an embodiment of the present invention, the means for providing the weighting factor are capable of providing the weighting signal equal to the sum of a determined constant and of a term having its sign depending on the angle between the complex signal corresponding to the last received pair of digital signals and the complex signal corresponding to the previously-received pair of digital signals.

According to an embodiment of the present invention, the means for providing the weighting factor are capable of providing the weighting signal equal to the sum of the determined constant and of a term proportional to the cosine of the angle between the complex signal corresponding to the last received pair of digital signals and the complex signal corresponding to the previously-received pair of digital signals.

The present invention also provides a timing correction loop for a digital demodulator for digital transmission in phase modulation or amplitude and phase modulation, comprising analog-to-digital converters receiving a pair of analog signals and successively providing, at the rate of a sampling clock signal, pairs of digital sampled signals representative of the components of complex signals; a device for providing a digital error signal such as previously defined, successively receiving pairs of digital signals obtained by filtering of the pairs of sampled digital signals; and means for providing a sampling clock signal having its frequency varying according to the error signal.

The present invention also provides a timing correction loop for a digital demodulator for digital transmission in phase modulation or amplitude and phase modulation, comprising analog-to-digital converters receiving a pair of analog signals and successively providing at a determined frequency pairs of sampled digital signals representative of the components of complex signals; interpolation means receiving the sampled pairs of digital signals and capable of successively providing pairs of digital signals interpolated from last pairs of received sampled digital signals and on a control signal; a device for providing a digital error signal such as defined previously, successively receiving the pairs of interpolated digital signals; and means for providing the control signal which varies according to the error signal.

The present invention also provides a digital demodulator receiving a signal modulated by a phase modulation or by an amplitude and phase modulation, comprising a unit of baseband transfer of the modulated signal capable of providing a pair of analog signals representative of the components of a complex signal; and a timing correction loop such as defined previously, receiving the pair of analog signals.

The present invention also provides a method for providing a digital error signal, for a timing correction loop of a digital demodulator for digital transmission by phase modulation or by amplitude and phase modulation, comprising the steps of successively receiving pairs of digital signals representative of the components of complex signals; providing a difference signal representative of the difference between the modulus, raised to a determined power, of the complex signal corresponding to the last received pair of digital signals and the modulus, raised to the determined power, of the complex signal corresponding to the previously-received pair of digital signals; providing a weighting factor which depends on the angle between the complex signal corresponding to the last received pair of digital signals and the complex signal corresponding to the previously-received pair of digital signals; and providing the error signal proportional to the product of the difference signal and of the weighting factor.

According to an embodiment of the present invention, the weighting factor is equal to the sum of the determined constant and of a term proportional to the cosine of the angle between the complex signal corresponding to the last received pair of digital signals and the complex signal corresponding to the previously-received pair of digital signals.

According to an embodiment of the present invention, the weighting factor is equal to the sign of the sum of the determined constant and of a term equal to the cosine of the angle between the complex signal corresponding to the last received pair of digital signals and the complex signal corresponding to the previously-received pair of digital signals.

According to an embodiment of the present invention, the determined constant is zero.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 1 shows an example of a constellation for a four-state phase modulation;

FIG. 2 schematically shows the main components of a demodulator for digital transmission by phase modulation;

FIG. 3 shows an example of the variation, in the constellation plane, of the analog complex signal obtained after baseband transfer of the modulated signal;

FIG. 4 shows an example of a time variation of the modulus of the analog complex signal obtained after baseband transfer of the modulated signal;

DETAILED DESCRIPTION

Figure 5:
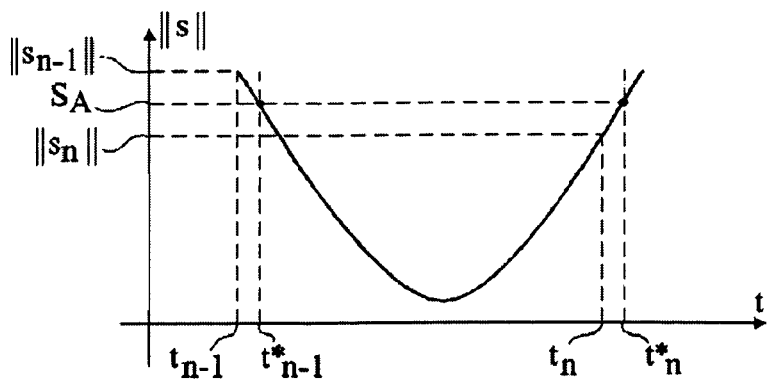
FIGS. 5 and 6 illustrate the timing error estimation method according to the present invention.

For clarity, the same elements have been designated with the same reference numerals in the different drawings. The present invention provides an original structure of the timing error estimation device based on an analysis of the time variation of the complex analog signal s obtained from components I*, Q* provided by baseband transfer unit 12. The present invention will now be described in the case of a four-state phase modulation (QPSK modulation). It should however be clear that the present invention also applies to any phase modulation. Further, as will be described in further detail hereafter, the present invention also applies to any modulation combining a phase modulation and an amplitude modulation.

FIG. 3 shows an example of the variation in the complex plane of the constellation of complex analog signal s obtained from components I* and Q* provided by unit 12 in the case of a noiseless transmission. The black dots represent the different states of the constellation between which signal s varies. After, two states for which the angle, taken at the origin, between the two states is 180° are called opposite states. In the present invention, this will designate the states associated with bit sequence "00" and "11" and the states associated with bit sequence "10" and "01". Similarly, two states for which the angle, taken at the origin, between two states is 90° are called adjacent states. In the present example, this will designate the state couples associated with bit sequence "00" and "10", "01" and "11", "11" and "01", and "01" and "00".

FIG. 4 shows an example of the variation of the modulus of s, noted $\|s\|$, in the time field. Since it is a phase modulation, $\|s\|$ has the same value, noted $S_A$, on passing through one of the states of the constellation. References $t_1$ to $t_4$ represent the times when s passes through one of the states of the constellation and thus correspond to the times at which a sampling must be performed by converters 14. Generally, performing a filtering by adapted filter 20 requires the sampling frequency of converters 14 to be greater than the symbol frequency. The sampling frequency can then be a multiple of the symbol frequency. Only the filtered sample which has been determined at a time of passing through one of the constellation states is then kept for timing correction loop 26.

The present inventors have shown that on transition between a state and the opposite state, a clear decrease in $\|s\|$ with respect to $S_A$ is observed almost in all cases. In FIG. 4, a transition between two opposite states corresponds to the transition between times $t_2$ and $t_3$. On transition between a state and an adjacent state or on transition between a state and the same state, $\|s\|$ varies little, slightly decreasing or increasing with respect to $S_A$. In FIG. 4, a transition between two adjacent states or between a state and the same state corresponds to the transitions between times $t_1$ and $t_2$, and $t_3$ and $t_4$. Further, the present inventors have shown that, on transition between two states, the distribution of $\|s\|$ is substantially symmetrical, in particular in the vicinity of the states.

Timing error estimation device 28 according to the present invention determines error signal $Err_n$ according to the following equation:

$$Err_n = f[\|s_n\| - \|s_{n-1}\|] \cdot [Re(s_n \cdot s^*_{n-1}) - A] \quad (7)$$

where $s_n = I_n + jQ_n$, $s^*_{n-1}$ corresponds to the conjugate of $s_{n-1}$ and A is a determined real constant. Constant A is determined to accelerate the convergence of timing correction loop 26. It may be equal to 0. According to a variation of the present invention, modules $\|S_n\|$ and $\|s_{n-1}\|$ may be obtained by approximate expressions.

The first term in brackets substantially corresponds to the difference between the modulus of s sampled at time $t_n$ and the modulus of s sampled at the previous time $t_{n-1}$. Given the substantially symmetrical variation of $\|s\|$ between two optimal sampling states, the modulus difference is representative of the shift between the sampling times used with respect to the desired times. The first term in brackets of equation (7) is weighted by the second term in brackets, called the weighting factor. The weighting factor is equal to the sum of a constant and of a term proportional to the cosine of the angle, taken at the origin, between the two successive samples. In the case of a transition between a state and the opposite state, the angle between the two complex signals being close to 180°, a cosine close to −1 is obtained. On transition between a state and the same state, a cosine close to 1 is obtained. In the case of a transition between a state and an adjacent state, a cosine close to 0 is obtained.

Figure 6:
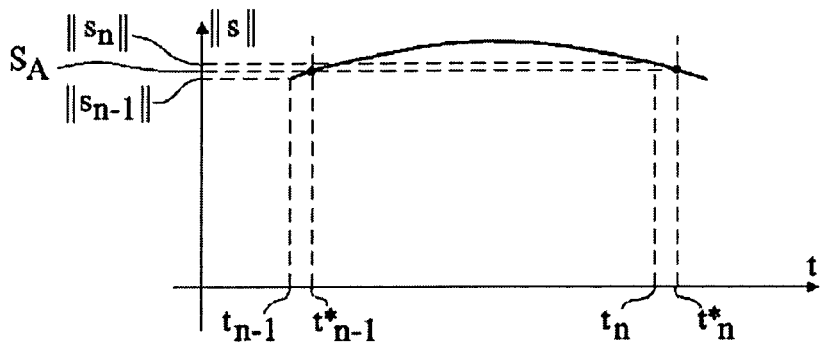

FIGS. 5 and 6 illustrate the error signal determination method when signal s varies, respectively, from a state to the opposite state and from a state to the same state, or from a state to an adjacent state. In FIGS. 5 and 6, the used sampling times $t_{n-1}$ and $t_n$ are ahead of optimal sampling times $t^*_{n-1}$ and $t^*_n$, the shift between the used sampling times and the optimal sampling times being the same. Term $\|s_n\| - \|s_{n-1}\|$ effectively appears, on transition from a state to an adjacent state or on transition from a state to the same state, to be much smaller than term $\|s_n\| - \|s_{n-1}\|$ on transition between a state and the opposite state. More generally, for a phase modulation of more than four states, the transitions between a state and as remote as possible a state of the constellation provide the highest values for term $\|s_n\| - \|s_{n-1}\|$.

The present inventors have shown that the contribution to error signal $Err_n$ is essentially due to term $\|s_n\| - \|s_{n-1}\|$. For a phase modulation, the transitions between a state and as remote as possible a state of the constellation providing the highest values for term $\|s_n\| - \|s_{n-1}\|$, such transitions are thus those taking the most part in the regulation performed by timing correction loop 26. Since for such transitions, the variation of $\|s\|$ is known with a strong probability, term $\|s_n\| - \|s_{n-1}\|$ may thus be used to determine an error signal representative of the shift between the used sampling times and the optimal sampling times. The weighting factor introduces a non-linearity in the expression of error signal $Err_n$ which ensures a convergence of timing correction loop 26.

The present inventors have shown that timing correction loop 26 according to the present invention also converges for a modulation combining an amplitude modulation and a phase modulation.

For a QPSK modulation, according to the choice of constant A, the weighting factor may, besides, enable further limiting the participation in the regulation obtained by the timing correction loop of the transitions between a state and the same state or between a state and the adjacent state. As an example, for a zero constant A, the weighting factor is zero for a transition between a state and an adjacent state since the angle between $s_n$ and $s_{n-1}$ then is approximately 90°. For $A = <\|s_n\|^2>/2$, where $<\|s_n\|^2>$ corresponds to the average of the square of $\|s_n\|$, the weighting factor is approximately ½ for a transition between a state and the same state and approximately −½ for a transition between a state and an adjacent state.

Generally, for a phase modulation with more than four states, the weighting factor may be selected to privilege, for the determination of error signal $Err_n$, the transitions between two states for which the angle between states is closest to 180° or 0° with respect to the transitions between two states for which the angle between states is closest to 0° or to 90°.

According to a variation of the present invention and taking the foregoing into account, the weighting factor may be replaced with the sign of the second term in brackets of equation (7). Timing correction loop 26 thus always enables obtaining the convergence of the sampling times towards the optimal sampling times.

According to another variation of the present invention, for the determination of error signal $Err_n$, modulus $\|s_n\|$ may be replaced with an approximate expression. As an example, modulus $\|s_n\|$ may be obtained by the following approximate expression:

$$\|s_n\|=\|I_n+jQ_n\|\approx sup(|I_n|,|Q_n|)+\tfrac{1}{2}inf(|I_n|,|Q_n|) \qquad (8)$$

According to another variation of the present invention, the first term in brackets of equation (7) may be replaced with the difference of the squares of the modules of the successive samples of s. When error estimation unit 28 is obtained with dedicated circuits, the determination of the square of the modulus of a complex signal may, in general, be obtained more simply than the simple determination of the modulus.

Figure 7:
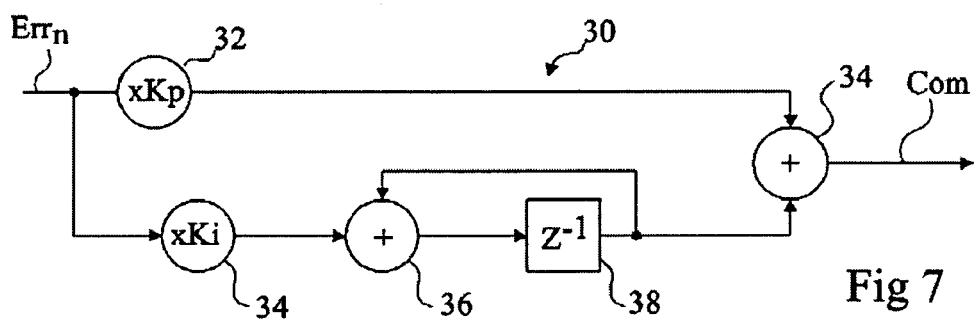
FIG. 7 shows in more detailed fashion the components of the filter used for the timing correction loop.

FIG. 7 shows an example of the forming of filter 30 of timing correction loop 26. It is a first order filter. Filter 30 comprises two paths: a proportional path and an integral path. In the proportional path, error signal $Err_n$ is provided to an amplification unit 32 in which it is multiplied by a proportionality constant Kp, then provided to a first input of an adder 34. In the integration path, signal $Err_n$ is provided to an amplifier 34 in which it is multiplied by an integration constant $K_i$, then provided to a first input of an adder 36. The output of adder 36 drives a shift unit 38 which stores, on each symbol clock pulse, the value provided by adder 36 and provides the value previously stored to the second input of adder 36. The output of shift unit 38 is provided to the second input of adder 34. Adder 34 provides control signal Com. Such a first order filter conventionally enables following a sampling error both in phase and frequency.

Figure 8:
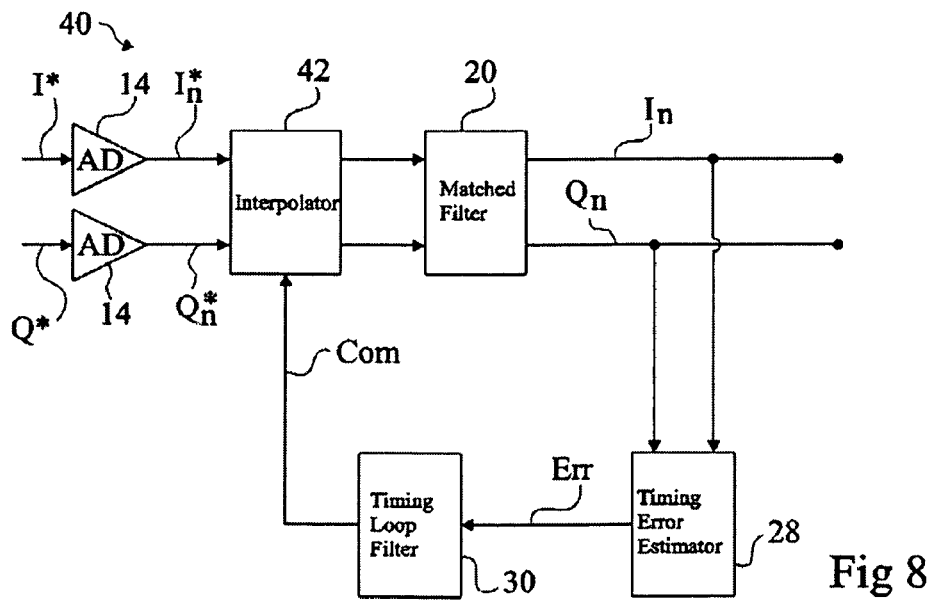
FIG. 8 shows another example of the forming of the demodulator according to the present invention.

FIG. 8 illustrates another example of a demodulator 40 for digital transmission by phase modulation in which timing error estimation unit 28 according to the present invention may be used. Elements common with demodulator 10 shown in FIG. 2 are indicated with same reference numerals. For demodulator 40, analog-to-digital converters 14 sample at a fixed sampling frequency the signals I* and Q* provided by the baseband transfer unit and drive an interpolator 42, capable of determining, by an interpolation algorithm, at least one sample per symbol based on the successive samples provided by each converter 14 at a determined time and on control signal Com. The rest of demodulator 30 is identical to demodulator 10 shown in FIG. 2, where the carrier shift correction loop is not shown.

The present invention has many advantages:

First, the error signal provided by the timing error estimation unit according to the present invention is independent from the carrier shift. Indeed, since the first term in brackets of equation (7) is formed by the difference between two modules, it is independent from any rotation of the constellation which results from an incorrect transposition of the baseband-modulated signal. The second term in brackets of equation (7) being proportional to the cosine of the angle of two successive samples, it is also independent from any rotation of the constellation, if said rotation is sufficiently slow, which is generally the case at this step of the demodulation.

Second, the timing error estimation unit according to the present invention does not require determination of additional inter-symbol values between two samples. This enables simplifying the structure of the timing error estimation unit when it is formed by dedicated circuits.

Third, the algorithm implemented for the error signal determination is relatively simple. This enables simplifying the structure of the timing error estimation unit when it is formed by dedicated circuits.

Of course, the present invention is likely to have various alterations, modifications, and improvements which will readily occur to those skilled in the art. In particular, the carrier shift correction loop has been shown as interleaved with the timing correction loop. The carrier shift correction loop may however be provided before or after the timing correction loop.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for providing a digital timing error signal, for a timing correction loop of a digital demodulator for digital transmission by phase modulation or amplitude and phase modulation, the device successively receiving pairs of digital signals representative of the components of complex signals, and comprising:

means for providing a difference signal representative of the difference between the modulus, raised to a determined power, of the complex signal corresponding to the received pair of digital signals and the modulus, raised to said determined power, of the complex signal corresponding to the previously-received pair of digital signals;

means for providing a weighting factor which depends on the angle between the complex signal corresponding to the received pair of digital signals and the complex signal corresponding to the previously-received pair of digital signals; and means for providing said timing error signal, proportional to the product of the difference signal and the weighting factor.

2. The device of claim 1, wherein the weighting factor providing means provides a weighting signal equal to the sum of a determined constant and a term having its sign depending on the angle between the complex signal corresponding to the received pair of digital signals and the complex signal corresponding to the previously-received pair of digital signals.

3. The device of claim 1, wherein the weighting factor providing means provides a weighting signal equal to the sum of the determined constant and a term proportional to the cosine of the angle between the complex signal corresponding to the received pair of digital signals and the complex signal corresponding to the previously-received pair of digital signals.

4. A timing correction loop for a digital demodulator for digital transmission in phase modulation or amplitude and phase modulation, comprising:

analog-to-digital converters receiving a pair of analog signals and successively providing, at the rate of a sampling clock signal, pairs of sampled digital signals representative of the components of complex signals;

a device for providing the digital timing error signal of claim 1, successively receiving pairs of digital signals obtained by filtering of the pairs of sampled digital signals; and means for providing a sampling clock signal having its frequency varying according to the timing error signal.

5. A timing correction loop for a digital demodulator for digital transmission in phase modulation or amplitude and phase modulation, comprising:

analog-to-digital converters receiving a pair of analog signals and successively providing at a determined frequency pairs of sampled digital signals representative of the components of complex signals;

interpolation means receiving the sampled pairs of digital signals and capable of successively providing pairs of digital signals interpolated from the pairs of received sampled digital signals and on a control signal;

a device for providing the digital liming error signal of claim 1, successively receiving the pairs of interpolated digital signals; and means for providing said control signal, which varies according to the timing error signal.

6. A digital demodulator receiving a signal modulated by a phase modulation or by an amplitude and phase modulation, comprising:

a unit of baseband transfer of the modulated signal capable of providing a pair of analog signals representative of the components of a complex signal; and the timing correction loop of claim 4, receiving the pair of analog signals.

7. A method for providing a digital timing error signal, for a timing correction loop of a digital demodulator for digital transmission by phase modulation or by amplitude and phase modulation, comprising the steps of:

successively receiving pairs of digital signals representative of the components of complex signals;

providing a difference signal representative of the difference between the modulus, raised to a determined power, of the complex signal corresponding to the received pair of digital signals and the modulus, raised to the determined power, of the complex signal corresponding to the previously-received pair of digital signals;

providing a weighting factor which depends on the angle between the complex signal corresponding to the received pair of digital signals and the complex signal corresponding to the previously-received pair of digital signals; and providing said timing error signal, proportional to the product of the difference signal and the weighting factor.

8. The method of claim 7, wherein the weighting factor is equal to the sum of a determined constant and a term proportional to the cosine of the angle between the complex signal corresponding to the received pair of digital signals and the complex signal corresponding to the previously-received pair of digital signals.

9. The method of claim 7, wherein the weighting factor is equal to the sign of the sum of a determined constant and a term equal to the cosine of the angle between the complex signal corresponding to the received pair of digital signals and the complex signal corresponding to the previously-received pair of digital signals.

10. The method of claim 8, wherein the determined constant is zero.

* * * * *

UNITED STATES PATENT AND TRADEMARK OFFICE
CERTIFICATE OF CORRECTION

PATENT NO. : 7,660,377 B2 Page 1 of 1
APPLICATION NO. : 11/270388
DATED : February 9, 2010
INVENTOR(S) : Jacques Meyer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Thirtieth Day of November, 2010

David J. Kappos
*Director of the United States Patent and Trademark Office*